United States Patent Office 3,305,591
Patented Feb. 21, 1967

3,305,591
RESOLUTION OF TERPENE ALCOHOLS BY ELUTION CHROMATOGRAPHY USING OPTICALLY ACTIVE POLYMER
Morton Batlan Epstein, Linden, and John Fred Gerecht, Somerville, N.J., assignors to Colgate-Palmolive Company, New York, N.Y., a corporation of Delaware
No Drawing. Filed May 8, 1963, Ser. No. 279,010
4 Claims. (Cl. 260—631)

This invention has to do with a process for resolving mixtures of compounds differing in optical activity by interestification. More particularly, the invention relates to the resolution of optically active compounds from mixtures containing the same by contacting the mixtures with optically active polymers under interesterification conditions.

Many mixtures of optically active compounds are well known in the art, and some have been known for more than a century. Typical of such mixtures are the following: terpene alcohols, borneol, menthol, tartaric acids, lactic acids, aspartic acids, malic acids, mandelic acids, alpha-hydroxy butyric acids, alpha-methyl butyric acids, chloromalic acids, amyl alcohols, octyl alcohols, etc.

The term "interesterification" is used herein generically as inclusive of the reactions: alcoholysis, where an ester reacts with an alcohol in the presence of base catalyst; acidolysis, where an ester reacts with free fatty acid; and ester interchange, where two esters are made to react as in the presence of alkoxide ion. (Fats and Oils, H. G. Kirschenbauer, Reinhold, 2nd edition, 1960, page 31.)

It is an object of the present invention to provide a process for preferentially separating compounds of different optical activity from mixtures containing the same by interestification. It is another object of the invention to separate organic optical antipodes, from mixtures of the same. Still another object of the invention is to resolve a mixture comprising racemic menthols. Another particular object is to resolve a mixture of alpha-methyl butyric acids. Other objects of the invention will appear from the following descriptive material.

This invention is directed to a process for resolving a mixture of two or more compounds differing in optical activity. A mixture is contacted with a body of an optically active polymer under interesterification conditions. In this way, one of the optically active compounds present in the mixture is preferentially (but not exclusively) reacted with the polymer. A fraction more concentrated with one of the optically active compounds than in the original mixture, is then separated from the polymer. The polymer is generally completely recoverable.

Optically active polymers are employed in this invention. Preferably, optical activity of the polymer is in the backbone chain thereof. Typical of such polymers are: a copolymer of an optically active vinyl lactate and maleic anhydride; an insoluble, cross-linked copolymer of the said lactate and anhydride; those formed by reaction of maleic anhydride, laevo- or dextro-alkyl methacrylates, and divinyl benzene. Another similarly active polymer is derived from an ester of sorbic acid. The latter polymer is described in Chemical and Engineering News, January 16, 1961, at page 44.

Instead of the anhydride form of a polymer, as indicated above, a polymer can be converted, for example, to the ester or amide form by treatment with an alcohol or an amine, respectively. Polymers in the form of an ester or an amide are generally more useful herein.

The process of this invention can be carried out, by way of illustration, by percolating a mixture through a body or column of the optically active polymer. Compounds of differing optical activity, including antipodes, present in the mixture travel down the column at differing rates. The mixture is generally used in the form of a solution, in combination with an inert solvent. Typical of such solvents are tetrahydrofuran, benzene, ethyl ether, dimethyl ether of ethylene glycol, etc. It is to be understood, however, that the solvent so selected is unreactive with the compounds present in the mixture and with the polymer. After the charge mixture has been contacted with the polymer, an eluting agent is used in order to effect a separation of optically active compounds. These optically active compounds are then separated by collecting the eluate in fractions. The eluting agent can be the same as the solvent originally used or can be different. The eluting agent can be reactive with the polymer. Typical of such reactive eluting agents are methyl and ethyl alcohols, acetic acid, water, etc.; such an agent is selected in keeping with the chemical composition and structure of the polymer. The optically active materials can be separated from the eluting agent by any one of a number of well-known separation techniques, including distillation, crystallization and the like. The temperature at which contact of the original mixture and polymer is carried out can affect the efficiency of the resolution or separation desired, and is a temperature characteristic of interesterification conditions, e.g., from about 20° C. to about the boiling point of the solvent used.

The polymer used herein can be reactivated for further use by contacting the same with a hot inert gas or air in order to drive off material collected thereon, or it can be reactivated by washing the same with a large amount of eluting agent.

Catalysts can also be used to aid in collecting preferentially an optically active compound from its closely related antipode, and can be used also to effect release of the same from the polymer. Catalysts such as para-toluene sulfonic acid, trifluoroacetic acid, and alkoxides (e.g., sodium methylate), are useful.

The invention is illustrated, and in no sense limited by, the following representative examples.

EXAMPLE 1

In this example, a copolymer of optically active vinyl lactate and maleic anhydride is rendered insoluble by cross-linking by exposing the same to gamma rays from a radioactive cobalt source. A granular bed in the form of a column of the insoluble resin is prepared, and is then treated with ethanol to convert the anhydride groups to ethyl esters and to remove the lactate groups. A solution of racemic methyl alpha-methylbutyrate in tetrahydrofuran is introduced into the column with a minor amount of trifluoroacetic acid as catalyst and is thereafter eluted slowly with the same solvent and catalyst. Fractions are collected. The alpha-methylbutyric acid is resolved into its optical antipodes.

The anhydride groups can be converted to amides, as by the use of aliphatic amines. The solvent catalyst system can have a minor amount of a lower aliphatic organic acid to aid the continual transesterification process that effects the resolution. And the treatment of the anhydride groups can be carried out before preparation of the insoluble resin in the form of a column.

EXAMPLE 2

An equal number of moles of maleic anhydride and dextro-2-butyl methacrylate with from two to twenty percent of the weight of the other monomers of divinyl benzene (as a cross-linking agent) is reacted in the presence of approximately one-half of one percent of benzoyl peroxide (an initiator). This suspension polymerization is carried out in conventional manner in order to form a cross-linked polymer in granular, water-insoluble solid form. The polymer possesses optical activity, as determined by measurement of a suspension of the insoluble polymer in a liquid medium of identical refractive index. The polymer can be transformed to the ester of a non-optically active alcohol and, upon remeasurement, will be found to still have optical activity.

A solution of racemic menthol in tetrahydrofuran containing a minor amount (e.g., 0.5 percent by weight of racemic menthol) of para-toluene sulfonic acid as a catalyst, is introduced into a column of the optically active resin, and is thereafter eluted slowly with a dilute solution of tetrahydrofuran containing ethyl alcohol and a small amount of para-toluene sulfonic acid. Fractions are collected. The menthol is resolved into its optical antipodes.

The present invention has been described with reference to illustrative examples and conditions; however, it will be appreciated by those skilled in the art that other variations and modifications of this invention can be employed, without departing from the principle thereof. Thus, if will be understood that the invention is not limited to the particular types of compositions set forth in the illustrative discussion nor to the particular ingredients cited therein. It is intended in the appended claims to cover all such variations and modifications.

We claim:

1. A process for resolving a mixture of terpene alcohols differing in optical activity which comprises: intimately contacting said mixture with a body of optically active, insoluble, cross-linked, organic polymer containing at least one ester group capable of reaction with said terpene alcohols thereby preferentially reacting said polymer with one of said optically active terpene alcohols, eluting the polymer with a solvent, and separating from the polymer a fraction more concentrated with one of said optically active terpene alcohols than was the original mixture, said optically active polymer being formed by reaction of maleic anhydride, a methacrylate selected from the group consisting of laevo- and dextro-alkyl methacrylates, and a divinyl benzene.

2. The process defined by claim 1 wherein the polymer is eluted with a solvent containing a minor amount of trifluoroacetic acid.

3. The process of claim 1 wherein said terpene alcohols are racemic menthols.

4. The process for resolving racemic menthol, which comprises: contacting a solution of the racemate in tetrahydrofuran containing interesterification catalyst with a body of an optically active polymer; eluting the polymer so contacted with a dilute solution of tetrahydrofuran containing ethyl alcohol and an additional amount of interesterification catalyst; and separating from the polymer a fraction more concentrated with one of the optical antipodes than the racemate; said polymer being selected from the group consisting of esters and amides of an optically active polymer of maleic anhydride, a methacrylate, and a divinyl benzene; said methacrylate being selected from the group consisting of laevo- and dextro-alkyl methacrylates.

References Cited by the Examiner

UNITED STATES PATENTS 2,388,688  11/1945  Hass _____ 260—49 X

OTHER REFERENCES

Grubhofer et al., "Hoppe-Seylers Zeitschrift Fur Physiol. Chem." 296 (1954), pp. 263–266.

Kressman "Manufacturing Chemist," November 1956, pp. 454–458.

LEON ZITVER, *Primary Examiner.*

LORRAINE A. WEINBERGER, *Examiner.*

D. P. CLARKE, J. E. EVANS, *Assistant Examiners.*